US010400909B2

(12) United States Patent
Mott et al.

(10) Patent No.: US 10,400,909 B2
(45) Date of Patent: Sep. 3, 2019

(54) THREE POSITION FAST ACTING SOLENOID

(71) Applicant: BorgWarner Inc., Auburn Hills, MI (US)

(72) Inventors: Philip J. Mott, Auburn, NY (US); Miguel Raimao, Colorado Springs, CO (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 16/092,632

(22) PCT Filed: Apr. 6, 2017

(86) PCT No.: PCT/US2017/026304
§ 371 (c)(1),
(2) Date: Oct. 10, 2018

(87) PCT Pub. No.: WO2017/180424
PCT Pub. Date: Oct. 19, 2017

(65) Prior Publication Data
US 2019/0120401 A1    Apr. 25, 2019

Related U.S. Application Data

(60) Provisional application No. 62/320,862, filed on Apr. 11, 2016.

(51) Int. Cl.
F01L 1/34        (2006.01)
F16K 31/06       (2006.01)
F01L 13/00       (2006.01)
F01L 1/344       (2006.01)

(52) U.S. Cl.
CPC .......... *F16K 31/0679* (2013.01); *F01L 13/00* (2013.01); *F16K 31/0613* (2013.01); *F01L 1/34409* (2013.01)

(58) Field of Classification Search
CPC .............. F16K 31/0613; F16K 31/0679; F01L 1/34409; F01L 13/00
USPC ................................ 123/90.12, 90.15, 90.17
See application file for complete search history.

(56) References Cited

U.S. PATENT DOCUMENTS

| 5,184,578 A | 2/1993 | Quinn, Jr. et al. |
| 5,499,728 A | 3/1996 | Rumsey |
| 6,105,616 A | 8/2000 | Sturman et al. |
| 6,840,202 B2 | 1/2005 | Simpson |

(Continued)

FOREIGN PATENT DOCUMENTS

| EP | 1396614 A2 | 3/2004 |
| EP | 1757779 A2 | 2/2007 |

OTHER PUBLICATIONS

International Search Report for PCT/US2017/026304 dated Jul. 10, 2017.

Primary Examiner — Ching Chang
(74) Attorney, Agent, or Firm — Brown & Michaels, PC

(57) ABSTRACT

A three position fast acting solenoid which may be coupled to a spool valve with a center null position. The spool of the valve is moved to one of three positions by a momentary signal to either of two coils. The spool is held positively in each end position by magnetism, and in the center position by a mechanical stop, so that the valve requires no electrical input except when the valve is changing from one position to another.

20 Claims, 2 Drawing Sheets

(56) References Cited

U.S. PATENT DOCUMENTS

| | | | |
|---|---|---|---|
| 10,001,036 B2 * | 6/2018 | Smith | F01L 1/3442 123/90.17 |
| 2006/0157581 A1 | 7/2006 | Kiss et al. | |
| 2007/0113906 A1 | 5/2007 | Sturman et al. | |
| 2013/0236337 A1 | 9/2013 | Gummin et al. | |

* cited by examiner

THREE POSITION FAST ACTING SOLENOID

BACKGROUND OF THE INVENTION

Field of the Invention

The invention pertains to the field of solenoids. More particularly, the invention pertains to three position latching solenoids which can be used to actuate spool valves with a center null position.

Description of Related Art

Solenoids are used for many different applications, for example to actuate spool valves or other sorts of valves.

Three-way spool valves have a spool with fluid metering lands and grooves which is movable between a first position and a second position within a sleeve. In the first position, a center port in the sleeve is connected to a first port in the sleeve, and in the second position the center port is connected to a second port in the sleeve. Some three-way spool valves also have a centered position between the first position and second position in which the center port is blocked from either of the other two ports. This center position is called a "null" position.

FIG. 4 shows a schematic representation of a three position valve with a null position used with a cam-torque actuated (CTA) variable cam timing (VCT) phaser. In such an arrangement, a housing 30 has a number of volumes 39 each of which are divided into an advance chamber A and a retard chamber R by a vane 31 which is part of a rotor attached to the camshaft of an engine. The chambers A and R are kept filled with hydraulic fluid, usually engine oil, by an oil gallery (not shown).

A retard passage 33 leads fluid from the first port 51 of the valve 41 to or from retard chamber R, and an advance passage 32 leads fluid from the second port 52 of the valve 41 to or from advance chamber A. The center port 50 of valve 41 is connected to the retard passage through check valve line 35, and to the advance passage 32 through check valve line 34. The check valves in lines 34 and 35 permit fluid flow from the center port 50 to passages 32 and 33, and block flow in the other direction.

The housing is coupled to the crankshaft of the engine by a chain or belt (not shown), so that moving the vane 31 within the volume 39 changes the relative rotational position (phase) of the crankshaft and camshaft. In a CTA phaser as shown in FIG. 4, the rotor is rotated clockwise or counter-clockwise relative to the housing by the force of torques in the camshaft which are caused by the action of the valve followers riding on the cams of the camshaft. When the rotor is rotated in a clockwise direction in the figure to retard the phase of the camshaft relative to the crankshaft, vane 31 moves rightwardly such that the retard chamber R gets larger and the advance chamber A gets smaller. Conversely, when the rotor is rotated in a counter-clockwise direction in the figure to advance the phase of the camshaft relative to the crankshaft, vane 31 moves leftwardly such that the retard chamber R gets smaller and the advance chamber A gets larger. Because the chambers A and R are filled with fluid, allowing the vane 31 to rotate requires allowing fluid to flow from A to R or vice versa. If the fluid flow is blocked, the vane 31 is held in position against the force of the cam torques, and cannot rotate.

This selective routing of fluid is accomplished in the arrangement of FIG. 4 by using a three-way valve 41, which is schematically represented as three sections 41a, 41b and 41c.

When the valve 41 is in the center (null) position, shown in FIG. 4, fluid from retard chamber R is blocked from flowing through check valve line 35 by the check valve, and is blocked in line 37 by section 41b of the valve 41. Similarly, fluid from advance chamber A is blocked from flowing through check valve line 34 by the check valve, and is blocked in line 36 by section 41b of the valve 41.

If the valve 41 is in the first (advance) position, section 41a of valve 41 permits flow between first port 51 and center port 50, and blocks flow through second port 52. Thus, fluid from retard chamber R can flow through passage 33 and line 37 to first port 51, through the valve 41 to the center port 50, then through check valve line 34 to advance passage 32 into advance chamber A. This drains chamber R and fills chamber A, allowing cam torques to move the vane 31 counter-clockwise, which advances the timing.

If the valve 41 is in the second (retard) position, section 41c of valve 41 permits flow between second port 52 and center port 50, and blocks flow through first port 51. Thus, fluid from advance chamber A can flow through passage 32 and line 36 to second port 52, through the valve 41 to the center port 50, then through check valve line 35 to retard passage 33 into retard chamber R. This drains chamber A and fills chamber R, allowing cam torques to move the vane 31 clockwise, which retards the timing.

It will be understood that this CTA phaser application requires fast and accurate operation of the valve 41 by the Engine Control Unit (ECU), so that the phaser can be moved to precisely the cam/crank phase required by the engine load and speed and other conditions, and stopped at that phase.

In CTA phasers of the prior art which use three-way spool valves with a center null, the spool valve has been moved and held in position using a variable-force actuator such as a hydraulic cylinder with the hydraulic pressure controlled by a pulse-width modulated (PWM) solenoid (as in U.S. Pat. No. 5,184,578) or a variable-force solenoid (VFS) working against a bias spring (as in U.S. Pat. No. 5,497,728).

These prior art actuators require a continuous electrical signal, either a PWM pulsed signal or a variable voltage or current, to hold the spool in the desired position. This results in an electrical load on the controller and a thermal load in the solenoid coil, whether the valve is changing position or not. The solenoid coil needs to be of a size to withstand the continual electric current and thermal load without overheating.

U.S. Pat. No. 6,105,616 shows a three-position valve which uses two coils, one on each end of the spool. The housing and spool retain enough magnetism to maintain the position of the spool in position at one end of travel or the other even when power to the coils is terminated, so that the spool can latch into position by providing a digital pulse to one of the coils. The spool is biased to a central position by opposing springs of equal strength, so that when the spool is unlatched by a pulse to the coil at the opposite end, the springs urge the spool toward a centered position. There is no positive mechanical stop at the centered position and as such the centered position is purely a function of the force balance between the springs. This can present a challenge for achieving the desired null position as the relationship between force and deflection of springs of the same design can be quite variable due to tolerances.

SUMMARY OF THE INVENTION

The invention presents a three position fast acting solenoid with a center position. The solenoid is moved to one of three positions by a momentary signal to either of two coils. These signals may be momentary in case of a latching solenoid design or continuous in case of a conventional solenoid design. In such an application, the armature of the solenoid is held positively in each end position by magnetism and in the center position by a mechanical stop, so that the valve requires no electrical input to maintain its null position. The advantage of this new design is the use of a mechanical stop achieves an accurate null position regardless of the spring tolerances. The solenoid actuator can be used to move the spool in a spool valve, for example a two-way or three-way spool valve, or as an actuator for other applications.

DETAILED DESCRIPTION OF THE INVENTION

Figure 4:
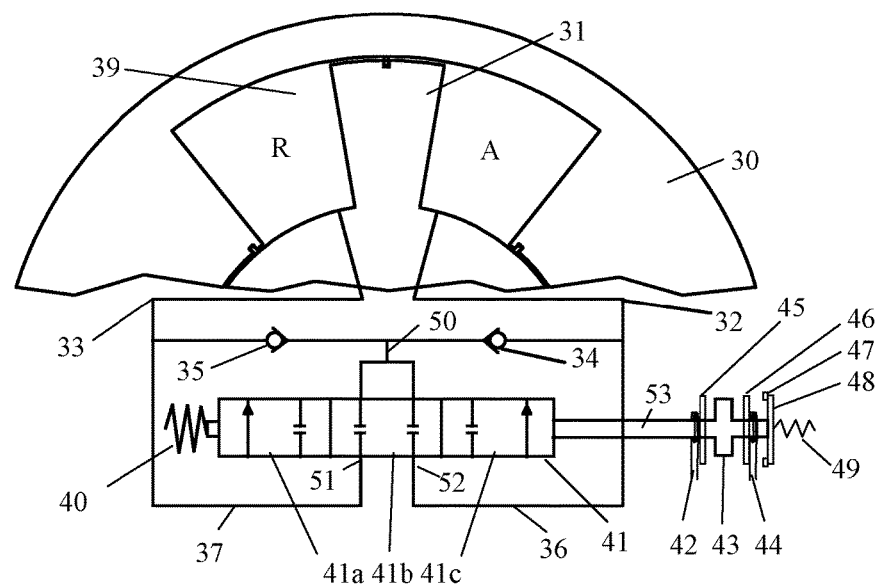
FIG. 4 shows a schematic representation of a cam-torque actuated variable cam timing phaser using the valve.

FIG. 4 shows a schematic representation of the three position fast acting solenoid of the invention, as it might be used to actuate a spool valve in a CTA phaser application. The hydraulic operation of the spool valve and phaser in the application is described in the background section above, and is conventional to such systems. It will be understood that while the solenoid of the invention is herein described as it would be used in a three-way spool valve application, the solenoid could also be used in two-way valves, or as an actuator for other applications.

The valve 41 can be moved into three positions, indicated schematically by first position 41a, center position 41b and second position 41c. The spool of the valve 41 is biased in one direction toward the first position 41a by first spring 40, and in the opposite direction toward second position 41c by second spring 49. The spool has an armature 43, which can be attracted by the coils. Alternatively, an extension 53 on the spool may be employed to connect to armature 43 which can be attracted by coils 42 and 44.

The first spring 40 acts directly on the spool valve 41, while the second spring 49 on the opposite side preloads a stop plate 48 against a stop 47 on the valve body. The stop plate 48 presses on the end of the spool extension 53. The spring preload of the second spring 49 has to be greater than the force from the first spring 40 so that stop plate 48 serves as a stop. In the center default position 41b shown in the schematic of FIG. 4, the spool extension 53 is stopped against the stop plate 48, which in turn rests on the stop 47 by way of spring 49. The valve 41 is held in position 41b, which is set by stop 47 and cannot move it any further unless acted on by an external force.

For purpose of this description, a latching solenoid design is assumed; however the invention will function just the same with a conventional solenoid design, with the exception that a conventional solenoid will require continuous electrical input to maintain the valve 41 in end positions 41a or 41c. To move the valve 41 to the second position 41c, the first coil 42 is energized by a pulse of electrical power. This attracts armature 43 until the armature 43 contacts a stop 45. Armature 43 is retained against the stop 45 by magnetism, either by residual magnetism in the armature or by providing a permanent magnet on stop 45 The armature 43 may be hardened and/or employ a permanent magnet or appropriate material or appropriate geometry of the armature to increase its residual magnetic performance.

Because the stop plate 48 has been stopped by stop 47, when the valve 41 is in the second position 41c, the end of the spool extension 53 is no longer in contact with the stop plate 48 and the second spring 49 does not exert any force on the valve 41.

If it is now desired to move the valve 41 from the second position 41c back to center null position 41b, the second coil 44 can be energized, again by a pulse of electrical power. This attracts the armature 43 toward the second coil 44. If the pulse is of sufficiently short duration, the spool extension 53 moves under the bias force of first spring 40 until it contacts the stop plate 48, and then stops. The valve 41 is thus positively held in null position 41b, since the first spring 40 cannot overcome the force of the second spring 49 pressing on the stop plate 48, and there is no force exerted by the second coil 44 after the end of the pulse. Alternatively, the return of valve 41 from the second position 41c back to center null position 41b, can be initiated without use of second coil 44, but instead by cancelling the magnetic field in first coil 42.

To move the valve 41 from the null position 41b to the first position 41a, second coil 44 is once again energized by an electrical pulse to attract armature 43. Under the attraction of the second coil 44 on the armature 43, the spool extension 53 lifts the stop plate 48 against the force of second spring 49. Armature 43 moves until it contacts stop 46, and then armature 43 is retained against the stop 46 by magnetism, either by residual magnetism in the armature or by providing a permanent magnet on stop 46.

Finally, to move the valve 41 back from the first position 41a to the null position 41b, the first coil 42 is energized by a pulse of electrical power. This attracts armature 43, which is lifted off of stop 46, breaking the magnetic attraction. The spool extension 53 is thus moved toward the null position by the force of second spring 49 acting against the stop plate 48, until the stop plate 48 contacts the stop 47. Because the stop plate 48 has been stopped by stop 47, the second spring 49 cannot exert any force on the valve 41, and the valve 41 now stops and remains in the null position 41b, with the spool extension 53 being biased against the stop plate 48 by the action of the first spring 40. Alternatively, the return of valve 41 from the first position 41a back to center null position 41b can be initiated without use of first coil 42, but instead by cancelling the magnetic field in second coil 44.

Because the armature 43 is held in position by residual magnetism after the coil 42 or 44 is no longer energized, only a short pulse of power is required on the coil 42 or 44 to move the valve 41. As a result, there is little or no thermal load on coils 42 and 44 and the coils can be made significantly smaller and lighter than those required in applications where there is a continuous current through the coils.

Figure 1:
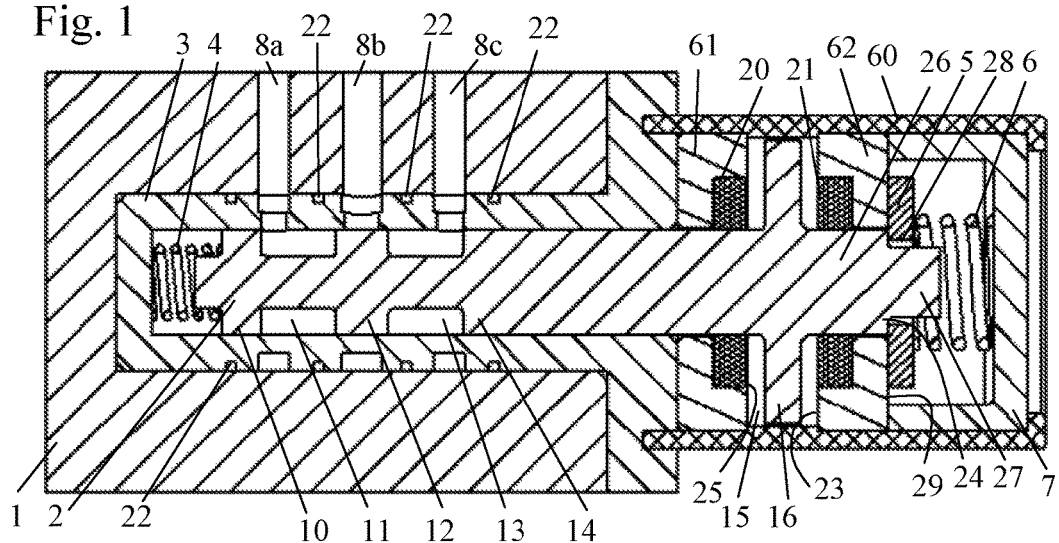
FIG. 1 shows a sectional view of the valve in a centered or null position.
Figure 2:
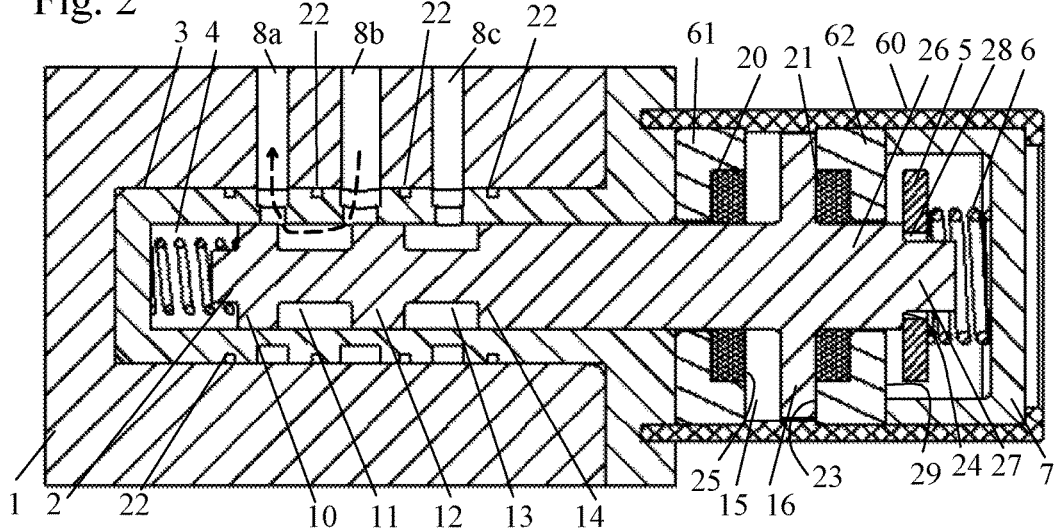
FIG. 2 shows a sectional view of the valve in a first position.
Figure 3:
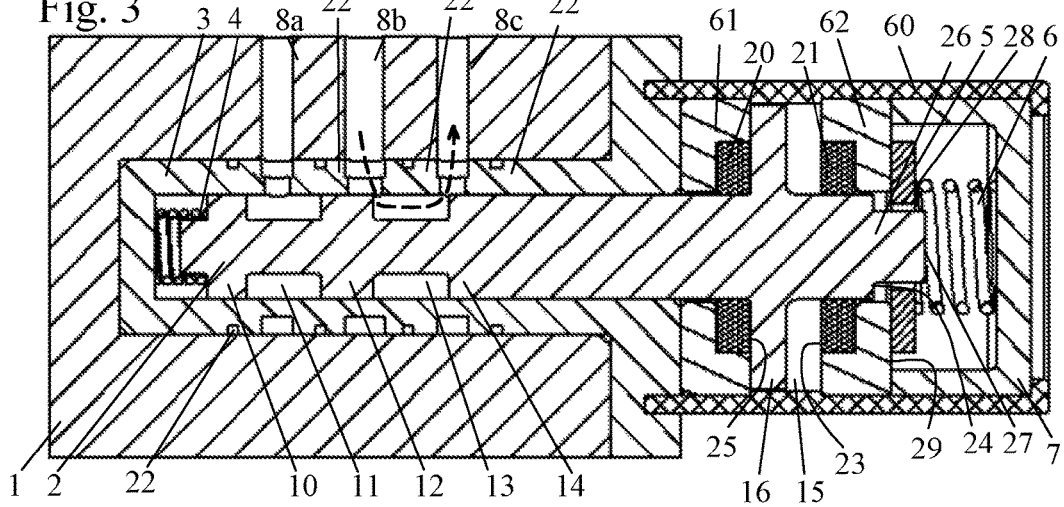
FIG. 3 shows a sectional view of the valve in a second position.

FIGS. 1 to 3 show a sectional view of the three position fast acting solenoid of the invention actuating a three-way spool valve to the center (null), first and second positions corresponding to positions 41b, 41a and 41c of the schematic in FIG. 4.

The three-way valve is made up of a spool 2 which slides in the open center of a sleeve 3. The sleeve 3 can be inserted into a valve body 1, which may be, as shown in the figures, in a bore in a phaser rotor or engine crankshaft or a separate body for mounting on a surface. Lands 10, 12 and 14 and grooves 11 and 13 on the spool 2 can block or open ports 8a (first port) 8b (center port) and 8c (second port) on the sleeve 3 and body 1.

Seals 22, preferably O-rings, are provided on the outside of the sleeve 3 to isolate the passages 8a-8c and limit fluid leakage between the sleeve 3 and the body 1. Alternative, sealing may also be accomplished by mechanical interference, epoxies, adhesives, or other elastomeric seals.

First spring 4 in the sleeve 3 provides a bias force against an inner end of the spool 2, biasing the spool 2 outward toward the first position shown in FIG. 2.

The outer end of the spool 2, opposite first spring 4, is extended to form the spool extension 26. An armature 16 is formed on the spool extension 26. As noted in the discussion of the schematic of FIG. 4, the armature 16 may be hardened or employ a permanent magnet or appropriate material or appropriate geometry to increase its residual magnetic performance.

First coil 20 and second coil 21 are positioned inside housing 60 which is constructed of non-magnetic material. The coils 20 and 21 are inset into flux guides 61 and 62, respectively. The area between coil 20 and flux guide 61 and coil 21 and flux guide 62 forms space 15. The armature 16 slides within space 15, between stops formed by surface 25 of first coil 20 and inner surface 23 of second coil 21. As noted in the discussion of FIG. 4, residual magnetism in armature 16 causes it to be held against surfaces 25 and 23. Optionally, permanent magnets may be provided on these surfaces 25 and 23 or on armature 16 to add extra latching force.

Second spring 6 presses on the stop plate 5, biasing the stop plate 5 against a stop formed by the outer surface 29 of flux guide 62. The second spring 6 is retained in place by plug 7 seated in the end of the flux guide 60. The outward end 24 of the spool extension 26 is preferably provided with a pin 27, for centering the stop plate 5 by seating in a central hole 28 in the stop plate 5.

As can be seen in FIG. 1, when the spool 2 is in the central null position, armature 16 is centered within space 15. The end 24 of the spool extension 26 rests on stop plate 5, which is held against surface 29 of second coil 21 by spring 6. Port 8b is blocked by land 12 in this position, such that there is no fluid communication between port 8b and 8a or 8c. Because the spring force of second spring 6 holding the stop plate 5 against stop 29 is higher than that of first spring 4, the spool 2 is positively held against stop plate 5 in this position.

In FIG. 2, the spool 2 is in the first position. Armature 16 is magnetically held against surface 23. The end 24 of the spool extension 26, with pin 27 seated in hole 28, moves the stop plate 5 outwardly from stop 29. Land 12 is moved to permit fluid flow between port 8a and port 8b through groove 11, while blocking flow between port 8b and port 8c.

In FIG. 3, the spool 2 is in the second position. Armature 16 is magnetically held against surface 25. Spring 6 holds stop plate 5 against stop 29, and the end 24 of spool extension 26 is no longer in contact with the stop plate 5. Land 12 is moved to permit fluid flow between port 8b and port 8c through groove 13, while blocking flow between port 8a and port 8b.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A three-way spool valve comprising:
    a) a sleeve having an open center, a first port, a center port, and a second port;
    b) a spool slidably movable within the sleeve between a first position in which fluid flow is permitted between the first port and the center port, a center position in which fluid flow is blocked, and a second position in which fluid flow is permitted between the second port and the center port, comprising:
        i) a spool body having a plurality of lands and a plurality of grooves, an inner end and an outer end;
        ii) a spool extension on the outer end of the spool body, having an armature and an outward end;
    c) a first spring within the sleeve pressing on the inner end of the spool, biasing the spool toward the first position;
    d) a first coil mounted in the sleeve, surrounding the spool extension between the outer end of the spool body and the armature of the spool extension, having an outer surface;
    e) a second coil mounted in the sleeve, surrounding the spool extension between the armature of the spool extension and the outward end of the spool extension, the first coil and the second coil being located and spaced apart such that when the armature of the spool extension contacts an inner surface of the second coil the spool is magnetically held in the first position, and when the armature of the spool extension contacts the outer surface of the first coil the spool is magnetically held in the second position;
    f) a stop plate in the sleeve; and
    g) a second spring having a spring force higher than a spring force of the first spring, biasing the stop plate against the outward end of the spool extension when the spool is at the first position and holding the stop plate against an outer surface of the second coil when the spool is at the center position or the second position.

2. The valve of claim 1, in which the outward end of the spool extension comprises a pin, and the stop plate has a central hole seating the pin of the outward end of the spool extension.

3. The valve of claim 1, in which the armature of the spool extension is magnetically held to the outer surface of the first coil and the inner surface of the second coil by residual magnetism.

4. The valve of claim 1, further comprising a permanent magnet on the outer surface of the first coil.

5. The valve of claim 1, further comprising a permanent magnet on the inner surface of the second coil.

6. The valve of claim 1, further comprising a permanent magnet on the armature of the spool extension.

7. The valve of claim 1, further comprising a valve body surrounding at least part of the sleeve.

8. A cam-torque actuated variable cam timing phaser for an internal combustion engine comprising:
    a) a housing comprising an outer circumference for accepting drive force;
    b) a rotor coaxially located within the housing, the housing and the rotor defining at least one vane separating a chamber in the housing into an advance chamber and a retard chamber, rotation of the vane within the chamber acting to shift the relative angular position of the housing and the rotor;
    c) a three-way spool valve mounted in a bore in the rotor, comprising:
        i) a sleeve having an open center, a first port, a center port, and a second port;

ii) a spool slidably movable within the sleeve between a first position in which fluid flow is permitted between the first port and the center port, a center position in which fluid flow is blocked, and a second position in which fluid flow is permitted between the second port and the center port, comprising:
    A) a spool body having a plurality of lands and a plurality of grooves, an inner end and an outer end;
    B) a spool extension on the outer end of the spool body, having an armature and an outward end;
iii) a first spring within the sleeve pressing on the inner end of the spool, biasing the spool toward the first position;
iv) a first coil mounted in the sleeve, surrounding the spool extension between the outer end of the spool body and the armature of the spool extension, having an outer surface;
v) a second coil mounted in the sleeve, surrounding the spool extension between the armature of the spool extension and the outward end of the spool extension, the first coil and the second coil being located and spaced apart such that when the armature of the spool extension contacts an inner surface of the second coil the spool is magnetically held in the first position, and when the armature of the spool extension contacts the outer surface of the first coil the spool is magnetically held in the second position;
vi) a stop plate in the sleeve; and
vii) a second spring having a spring force higher than a spring force of the first spring, biasing the stop plate against the outward end of the spool extension when the spool is at the first position and holding the stop plate against an outer surface of the second coil when the spool is at the center position or the second position;
d) a retard passage coupling the retard chamber and the first port;
e) an advance passage coupling the advance chamber and the second port; and
f) a check valve line coupling the center port to the advance passage and a check valve line coupling the center port to the retard passage, each check valve line having a check valve oriented to permit fluid flow from the center port and blocking fluid flow toward the center port.

9. The phaser of claim 8, in which the outward end of the spool extension comprises a pin, and the stop plate has a central hole seating the pin of the outward end of the spool extension.

10. The phaser of claim 8, in which the armature of the spool is magnetically held to the outer surface of the first coil and the inner surface of the second coil by residual magnetism.

11. The phaser of claim 8, further comprising a permanent magnet on the outer surface of the first coil.

12. The phaser of claim 8, further comprising a permanent magnet on the inner surface of the second coil.

13. The phaser of claim 8, further comprising a permanent magnet on the armature of the spool extension.

14. The phaser of claim 8, further comprising a valve body surrounding at least part of the sleeve.

15. A three position solenoid comprising:
a) a sleeve having an open center;
b) a spool slidably movable within the sleeve between a first position, a center position, and a second position, comprising:
    i) a spool body having an inner end and an outer end;
    ii) a spool extension on the outer end of the spool body, having an armature and an outward end;
c) a first spring within the sleeve pressing on the inner end of the spool, biasing the spool toward the first position;
d) a first coil mounted in the sleeve, surrounding the spool extension between the outer end of the spool body and the armature of the spool extension, having an outer surface;
e) a second coil mounted in the sleeve, surrounding the spool extension between the armature of the spool extension and the outward end of the spool extension, the first coil and the second coil being located and spaced apart such that when the armature of the spool extension contacts an inner surface of the second coil the spool is magnetically held in the first position, and when the armature of the spool extension contacts the outer surface of the first coil the spool is magnetically held in the second position;
f) a stop plate in the sleeve; and
g) a second spring having a spring force higher than a spring force of the first spring, biasing the stop plate against the outward end of the spool extension when the spool is at the first position and holding the stop plate against an outer surface of the second coil when the spool is at the center position or the second position.

16. The solenoid of claim 15, in which the outward end of the spool extension comprises a pin, and the stop plate has a central hole seating the pin of the outward end of the spool extension.

17. The solenoid of claim 15, in which the armature of the spool extension is magnetically held to the outer surface of the first coil and the inner surface of the second coil by residual magnetism.

18. The solenoid of claim 15, further comprising a permanent magnet on the outer surface of the first coil.

19. The solenoid of claim 15, further comprising a permanent magnet on the inner surface of the second coil.

20. The solenoid of claim 15, further comprising a permanent magnet on the armature of the spool extension.

\* \* \* \* \*